Figure 1:
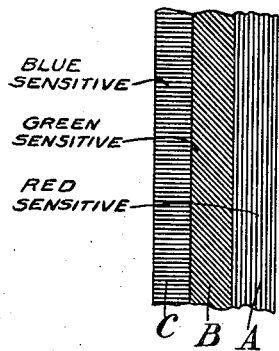
Figure 1:
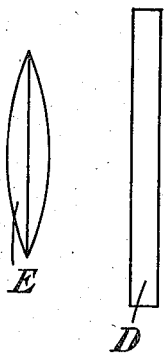

July 12, 1932.  T. T. BAKER  1,867,301
THREE-COLOR PHOTOGRAPHY
Filed Aug. 9, 1929

INVENTOR:
Thomas Thorne Baker
by Byrnes, Stebbins, Parmelee & Bleuer
his attorneys Patented July 12, 1932

1,867,301

UNITED STATES PATENT OFFICE

THOMAS THORNE BAKER, OF HATCH END, ENGLAND, ASSIGNOR, BY MESNE ASSIGNMENTS, TO AGFA ANSCO CORPORATION, OF BINGHAMTON, NEW YORK, A CORPORATION OF NEW YORK

THREE-COLOR PHOTOGRAPHY

Application filed August 9, 1929, Serial No. 384,794, and in Great Britain August 28, 1928.

This invention relates to three-color photography of the kind in which three primary color-sensation records are made simultaneously on three sensitive layers one behind another, such compound layers being known as "tri-packs."

Hitherto the three sensitive layers have usually been arranged with the blue-violet-recording layer in front and the orange-red-recording layer at the back. Owing to the turbidity of the front and intermediate layers, the image on the back layer is the least well-defined. When prints or transparencies are made from the three color-records by the subtractive method, the positive image from the orange-red record is a blue-green image, which is combined with magenta and yellow images from the other two records to form the complete picture in natural colors. Of these three "subtractive" colors, the blue-green or "minus red" image is the darkest visually, and therefore it plays the most important part in determining the degree of definition in the final picture.

With the usual arrangement, this darkest image is obtained from the least well-defined color-record, namely, the orange-red record, and therefore it has been impossible with this arrangement to obtain sharply defined pictures. The same consideration applies if the color synthesis is effected by an additive method, for example, in a three-color lantern; the definition of the orange-red record determines the quality of definition of the composite picture.

It has long been recognized that a well defined picture can be obtained, so long as the orange-red record is well-defined, even if the green record and the blue-violet record (and particularly the latter) are not well defined, and tri-packs have been proposed in which the orange-red sensitive layer was to be in front and the blue-violet-sensitive layer at the back. So far as I am aware, however, such proposals have never led to successful results in practice.

It is the object of the present invention to provide a tri-pack in which the orange-red-sensitive layer is in front (thus enabling sharply-defined composite subtractive pictures to be secured) while nevertheless the color-separation and "balance" of the three records are sufficiently good to enable a very close approximation to natural colors to be obtained.

According to the principal feature of the present invention, a tri-pack comprises a front layer of silver halide emulsion rendered highly sensitive to the red region of the spectrum but not sensitive (or only slightly sensitive) to the green region, an intermediate layer of silver halide emulsion rendered sensitive to the green region of the spectrum but not to the red region, and a back layer of non-color-sensitized silver halide emulsion having a substantially higher sensitivity than either of the other two emulsions, in combination with light-filtering means in front of (or incorporated in) the front layer arranged to absorb ultra-violet radiation, to transmit violet light and to absorb wholly or in part blue light.

According to a further feature of the invention, the front layer (and preferably also the intermediate layer) has a quantity of silver halide per unit of area which is only a small fraction (for example one-fifth or one-quarter) of that of a normal emulsion coating, while its characteristics are so chosen that a normal degree of contrast in the developed image can be readily obtained, for example, a degree of contrast the same or approximately the same as that given by the back emulsion layer with the same developer and time of development.

According to another feature of the invention, the back emulsion layer is treated with a substance which depresses its inherent green-sensitivity, for example, a dye having that property.

According to yet another feature of the invention, the intermediate emulsion layer is treated with a dye which depresses its blue-violet sensitivity but nevertheless transmits sufficient violet light to enable a satisfactory image to be obtained on the back layer.

A tri-pack according to this invention which has given satisfactory results will now be described with reference to the accompanying drawing. In Figure 1 the light filter is located in front of the camera lens, in Figure 2 it is located behind the lens, and in Figure 3 it is incorporated in the tripack itself.

The front emulsion layer A is a highly-contrasty silver-bromide emulsion (preferably containing little or no silver iodide) rendered extremely red-sensitive (but not green-sensitive) by means of a suitable sensitizer of the iso-cyanine or similar class. Its sensitivity to daylight is about 500 H. and D. and it is coated in such a way that the quantity of silver bromide per unit area is only about one-fifth of the normal.

If desired, substances, well known to those skilled in the art, may be added to reduce or destroy the sensitivity of the emulsion to green light.

The intermediate emulsion B is sensitized to green, for example, by means of erythrosine, and its sensitivity is about 300 H. and D. to daylight. A yellow dye may be added to this emulsion to reduce its blue-sensitivity, but the amount should be such as to permit sufficient violet light to pass to enable a record to be obtained on the third emulsion layer behind it. The intermediate emulsion is of a highly contrasty character and it is coated in such a way that the quantity of silver bromide per unit area is only about one-quarter of the normal.

The back emulsion layer C is of non-color-sensitized emulsion and has a daylight sensitivity of about 850 H. and D. It is of relatively low contrast, and it is made or treated in such a way as to reduce its sensitivity to green light as much as possible, as for example, it may be made without silver iodide or with only a very small proportion thereof, or substances (known to those skilled in the art) may be added which destroy or reduce its green sensitivity.

Figure 2:
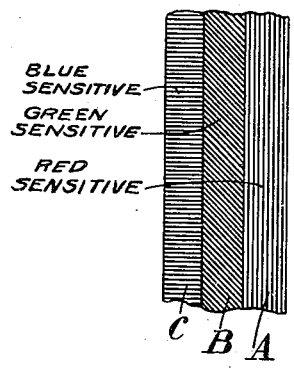
Figure 2:
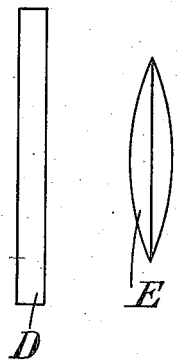
Figure 3:
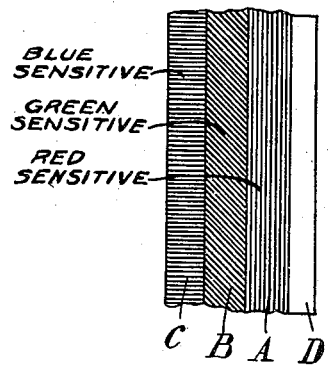
Figure 3:

As previously stated, a filtering layer D is employed in front of the tri-pack which absorbs ultra-violet radiation wholly, transmits the whole or a considerable proportion of the violet light and absorbs the whole or a considerable proportion of the blue light. This filtering layer D may be placed in front of or behind the lens E, as illustrated in Figures 1 and 2, or may be incorporated in the tri-pack itself (see Figure 3). Preferably, it comprises æsculine, a small proportion of filter yellow, and mandarin orange, these dyes being incorporated in a transparent medium in the well-understood manner. If dyes having similar absorption characteristics are chosen which have no deleterious effect on the emulsion, they may be incorporated in the front emulsion layer itself, but it is preferred to provide a separate filtering layer.

Pleasing results have been obtained by the use of a tri-pack constituted as described, in spite of the fact that some violet light is recorded on the front and intermediate layers and that the back layer records mainly the violet and very little blue.

I claim:—

1. A tri-pack comprising a front layer of silver halide emulsion rendered highly sensitive to the red-region of the spectrum but substantially insensitive to the green region, an intermediate layer of silver halide emulsion rendered sensitive to the green region of the spectrum but not to the red region, and a back layer of non-color-sensitized silver halide emulsion having a substantially higher sensitivity than either of the other two emulsions, in combination with light-filtering means for the front layer adapted to absorb ultra-violet radiation, to transmit violet light and to absorb at least a proportion of blue light.

2. A tri-pack according to claim 1 wherein the back emulsion layer is treated with a substance which depresses its inherent green-sensitivity.

3. A tri-pack according to claim 1 wherein the intermediate emulsion layer is treated with a dye which depresses its blue-violet sensitivity but nevertheless transmits sufficient violet light to enable a satisfactory image to be obtained on the back layer.

4. A tri-pack according to claim 1 wherein the intermediate emulsion layer is treated with a dye which depresses its blue-violet sensitivity but nevertheless transmits sufficient violet light to enable a satisfactory image to be obtained on the back layer, and the back emulsion layer is treated with a substance which depresses its inherent green-sensitivity.

5. A tri-pack according to claim 1 wherein the light-filtering means comprises æsculine, a small proportion of filter yellow, and mandarin orange.

6. A tri-pack according to claim 1 wherein the sensitivities to daylight of the front, intermediate and back layers are substantially in the ratio 10:6:17.

7. A tripack according to claim 1 wherein the front layer has a quantity of silver halide per unit area which is only a small fraction of that in a normal emulsion coating, so that it gives rise to a normal degree of contrast in the developed image which approximates to that in the back emulsion layer when the same developer and time of development are employed.

8. A tripack according to claim 1 wherein the intermediate layer has a quantity of silver halide per unit area which is only a small fraction of that in a normal emulsion coating, so that it gives rise to a normal degree of contrast in the developed image which approximates to that in the back emulsion layer when the same developer and time of development are employed.

9. A tripack according to claim 1 wherein the front layer has a quantity of silver halide per unit area which is between one fifth and one quarter of that in a normal emulsion coating, so that it gives rise to a normal degree of contrast in the developed image which approximates to that in the back emulsion layer when the same developer and time of development are employed.

10. A tripack according to claim 1 wherein the intermediate layer has a quantity of silver halide per unit area which is between one fifth and one quarter of that in a normal emulsion coating, so that it gives rise to a normal degree of contrast in the developed image which approximates to that in the back emulsion layer when the same developer and time of development are employed.

11. A tripack according to claim 1 wherein the front layer has a quantity of silver halide per unit area which is only a small fraction of that in a normal emulsion coating, so that it gives rise to a normal degree of contrast in the developed image which approximates to that in the back emulsion layer when the same developer and time of development are employed and the back emulsion layer is treated with a substance which depresses its inherent green sensitivity.

12. A tripack according to claim 1 wherein the intermediate layer has a quantity of silver halide per unit area which is only a small fraction of that in a normal emulsion coating, so that it gives rise to a normal degree of contrast in the developed image which approximates to that in the back emulsion layer when the same developer and time of development are employed and the back emulsion layer is treated with a substance which depresses its inherent green sensitivity.

In testimony whereof I affix my signature.

THOMAS THORNE BAKER.